W. F. KASPER.
WEED CUTTER.
APPLICATION FILED AUG. 18, 1916.

1,337,655.

Patented Apr. 20, 1920.
2 SHEETS—SHEET 1.

WITNESSES

INVENTOR
WALTER F. KASPER
BY
Paul & Paul
ATTORNEYS

W. F. KASPER.
WEED CUTTER.
APPLICATION FILED AUG. 18, 1916.

1,337,655.

Patented Apr. 20, 1920.
2 SHEETS—SHEET 2.

WITNESSES
M. R. McInnis
E. A. Paul

INVENTOR
WALTER F. KASPER
BY Paul & Paul
ATTORNEYS

UNITED STATES PATENT OFFICE.

WALTER F. KASPER, OF FAIRMONT, MINNESOTA, ASSIGNOR TO FAIRMONT GAS ENGINE & RAILWAY MOTOR CAR CO., OF FAIRMONT, MINNESOTA, A CORPORATION.

WEED-CUTTER.

1,337,655.   Specification of Letters Patent.   Patented Apr. 20, 1920.

Application filed August 18, 1916. Serial No. 115,700.

*To all whom it may concern:*

Be it known that I, WALTER F. KASPER, a citizen of the United States, resident of Fairmont, county of Martin, State of Minnesota, have invented certain new and useful Improvements in Weed-Cutters, of which the following is a specification.

My invention relates to machines for mowing the weeds on each side of a railroad track and the object of the invention is to provide means for automatically disengaging the clutch between the cutter bar and driving mechanism to prevent damage to the pitman or other parts when the bar is raised to its non-working position.

The invention consists generally in various constructions and combinations, all as hereinafter described and particularly pointed out in the claims.

Figure 1:
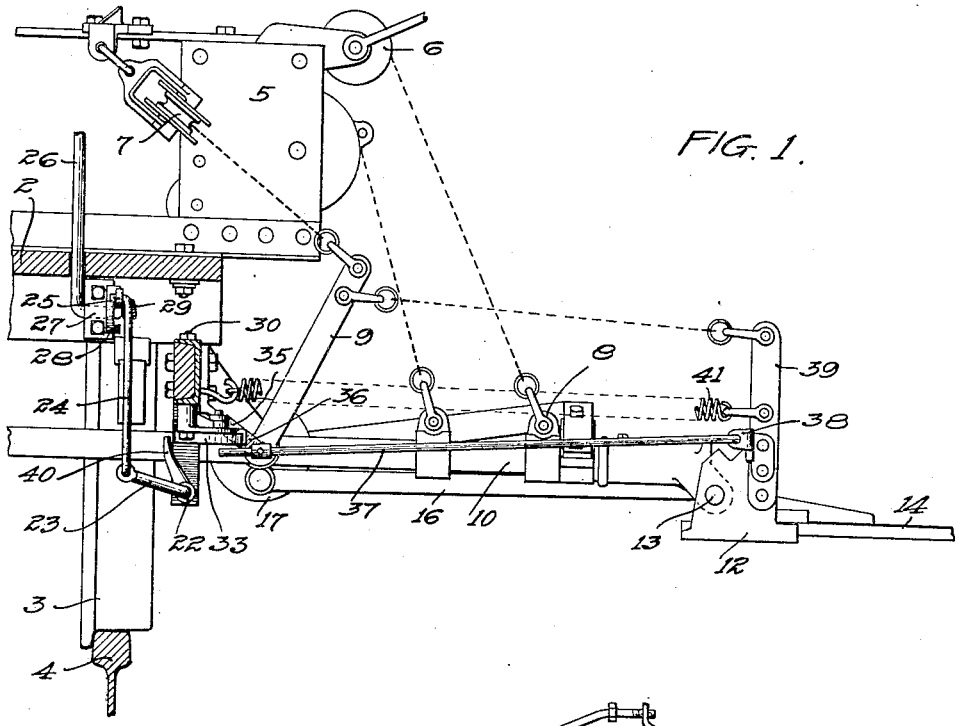
Figure 2:
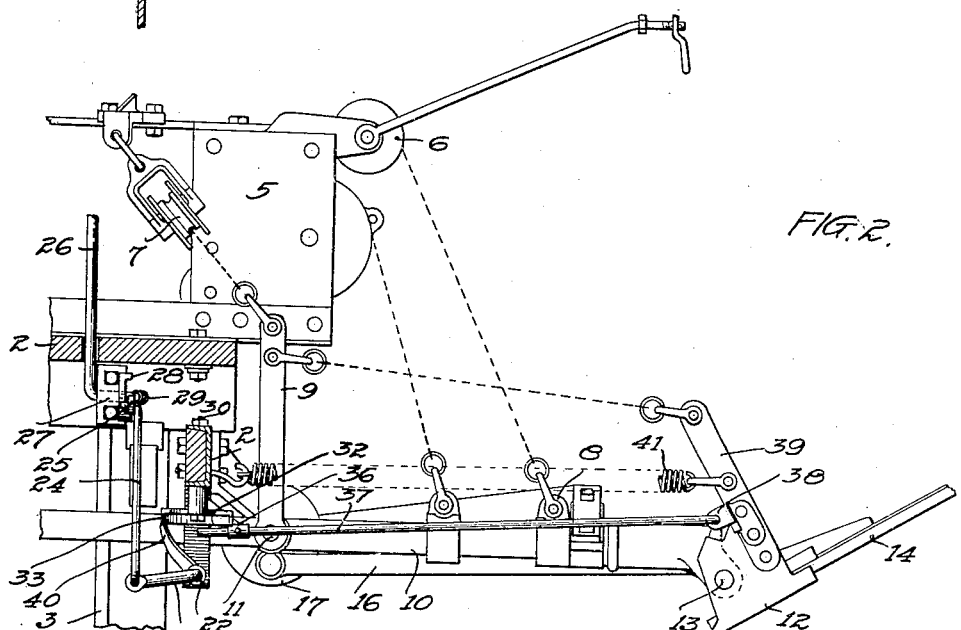
Figure 3:
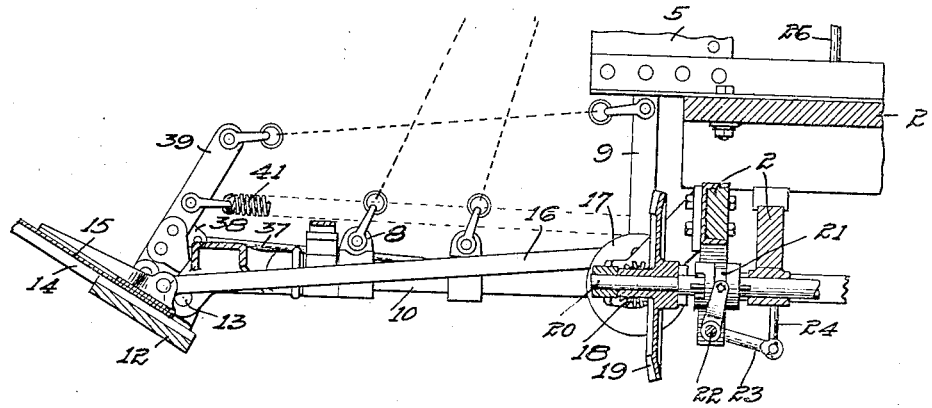
Figure 4:
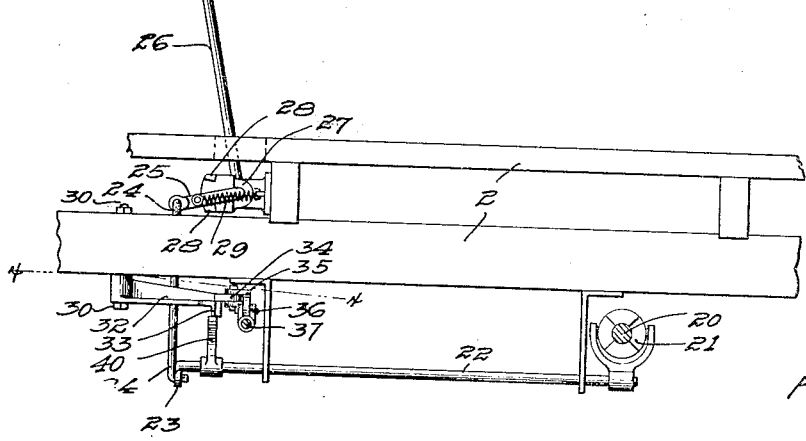
Figure 5:
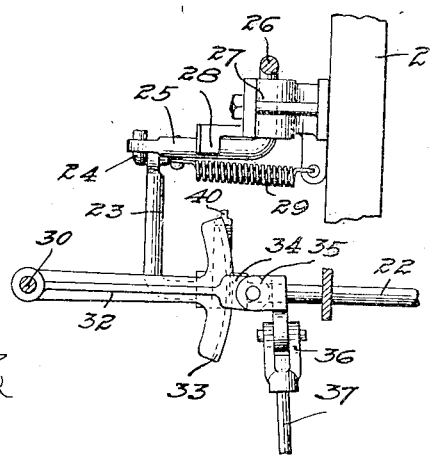

In the accompanying drawings forming part of this specification,

Figure 1 is a detail sectional view of a portion of a weed cutting machine with my invention applied thereto, the cutter bar being shown in a horizontal position, Fig. 2 is a similar view, showing the cutter bar raised, Fig. 3 is a view of a portion of the machine, showing the gearing for operating the cutter bar and the clutch control, Fig. 4 is a detail sectional view of the lever mechanism for shifting the clutch, Fig. 5 is a detail sectional view taken on the section line substantially x—x of Fig. 4.

In the drawing, 2 represents the platform of a car, having carrying wheels 3 and track rail 4. 5 is a frame mounted on the platform 2 and carrying sheaves 6 and 7 over which cables pass from the clamp 8 and loosely mounted arm 9. A bar 10 is mounted at one end on a pivot 11 and a shoe 12 has a pivotal connection at 13 with said bar and carries a guard bar 14 in which the sickle or cutter bar 15 is mounted. A pitman 16 is connected with said cutter bar and to a crank disk 17 which is driven through a pinion 18 and gear 19 from the shaft 20. A clutch 21 controls the operation of the gear 19. A shaft 22 is mounted in bearings adjacent to the clutch member 21 and provided at one end with a crank arm 23. A link 24 is pivotally connected to said arm and to an arm 25 on the lower end of the operating lever 26, which is journaled in a bracket 27 on the frame of the car. Stops 28 are provided on said bracket between which the arm 25 is movable, and a coiled spring 29 is connected to said arm 25 and to the bracket 27 for the purpose of holding the said arm on either side of the center of the lever bearing; that is, when the lever is thrown forward to the limit of its movement, the spring will hold it in such position and will exert a corresponding pull thereon when the lever is thrown to the limit of its movement in the other direction. The workman standing on the car platform may throw this lever back and forth and operate the clutch to start and stop the pitman and the cutter bar.

A bolt 30 is mounted on the frame of the car and supports a T-shaped plate 32 provided with a flange 33 and with an ear 34. A link 35 is pivotally connected with the ear 34 at one end and has a pivotal connection at its other end with a coupling 36, the pivots of said coupling and the link 35 on the ear 34 being substantially at right angles to one another and the coupling 36 is connected by a rod 37 with an ear 38 on an arm 39 that is secured to the shoe 12. An arm 40 is secured on the shaft 22 in the path of the flange 33 so that when the plate 32 is rocked by the movement of the rod 37 in raising the cutter bar the lever 26 will be actuated to shift the clutch and stop the operation of the cutter bar. This automatic disengagement of the driving clutch stops the pitman and prevents the possibility of breakage or damage thereto or the connecting parts should the operator attempt to raise the cutter bar to an upright position without first disconnecting it from the drive.

A spring 41 connects the arm 39 with the frame 2 to aid in lifting the cutter bar.

In the operation of the machine, when the arm 9 is rocked to tilt the cutter bar, the rod 37 will, through the mechanism described, rock the rod 22 and change the clutch to stop the movement of the cutter bar. This mechanism connected with the rod 22 will prevent the clutch from being thrown to its working position while the cutter bar is raised, but when it is lowered the locking device will be released, as indicated in Fig. 1, and thereupon the workman on the car can move the lever 26 to throw the clutch to its working position.

It will be understood that a similar mechanism is provided on the opposite side of the car, but as it corresponds substantially to the one shown herein I have not thought it necessary to illustrate it.

I claim as my invention:

1. The combination, with a railroad car platform, of a bar pivoted at one end thereon, a shoe mounted on the opposite end of said bar, a guide bar mounted on said shoe, a cutter-bar carried by said guide bar, a cutter-bar driving mechanism and a controlling clutch therefor, a lever mechanism for moving said clutch to an operative or inoperative position, means for raising said pivoted bar and with it said guide bar, and independent means for tilting said guide bar to a substantially upright, non-working position and mechanism actuated by the upward movement of said guide bar for operating said clutch to disengage said cutter bar driving mechanism.

2. The combination, with a railroad car platform, of a cutter guide bar mounted thereon, a cutter bar, a driving mechanism for said cutter bar and a controlling clutch therefor, a lever for operating said clutch, a rock shaft connected with said clutch and lever, an arm mounted on said shaft, an oscillating T-head having means for engaging said arm, and a rod connecting said T-head with said cutter bar.

3. The combination, with a railroad car platform, of a cutter guide bar mounted thereon, a cutter bar, a driving mechanism for said cutter bar, and a controlling clutch therefor, a lever for operating said clutch, a rock shaft connected with said clutch and lever, an arm on said shaft, an oscillating flanged plate for engaging said arm and rocking said shaft to disengage said clutch, means connecting said flanged plate with said cutter bar, said plate preventing the return of said arm and shaft to reëngage said clutch until said guide bar has been lowered to its working position.

In witness whereof, I have hereunto set my hand this 25th day of July 1916.

WALTER F. KASPER

Witnesses:
THEO. CLEMETSON,
CLARA MOLSTAD.